United States Patent [19]

Kielwein et al.

[11] Patent Number: 5,205,025
[45] Date of Patent: Apr. 27, 1993

[54] METHOD OF PRODUCING A SAFETY BELT RETRACTOR

[75] Inventors: Thomas Kielwein, Eschach; Johannes Schmid, Schwäb.Gmünd-Hussenhofen, both of Fed. Rep. of Germany

[73] Assignee: TRW Repa GmbH, Alfdorf, Fed. Rep. of Germany

[21] Appl. No.: 839,179

[22] Filed: Feb. 21, 1992

[30] Foreign Application Priority Data

Feb. 22, 1991 [DE] Fed. Rep. of Germany ... 9102117[U]

[51] Int. Cl.[5] .................. B23P 11/00; B23P 11/02
[52] U.S. Cl. .......................... 29/436; 29/453; 29/469; 29/525
[58] Field of Search ............ 29/893.2, 434, 436, 29/453, 469, 525; 297/468, 474, 475, 477, 478, 479

[56] References Cited

U.S. PATENT DOCUMENTS

| | | | |
|---|---|---|---|
| 4,342,435 | 8/1982 | Yanagihara | 297/475 X |
| 4,438,551 | 3/1984 | Imai | 297/479 X |
| 4,456,196 | 6/1984 | Takada et al. | 297/475 X |
| 4,519,652 | 5/1985 | Kamijo | 297/475 X |

*Primary Examiner*—Timothy V. Eley
*Attorney, Agent, or Firm*—Tarolli, Sundheim & Covell

[57] ABSTRACT

A safety belt retractor provided with a vehicle sensitive control system for its blocking mechanism is produced by providing a cap wherein said control system is received and mounting the cap with the control system on a side wall of the retractor housing. The cap and the control system are provided as a preassembled unit. The control system has a control disc to be mounted on the belt take-up shaft for joint rotation therewith. The control disc and shaft are provided with axial spline elements for engagement with each other. When the preassembled unit is placed on an adjacent side wall of the housing, the spline elements of the shaft and of the control disc come into engagement with each other.

13 Claims, 2 Drawing Sheets

METHOD OF PRODUCING A SAFETY BELT RETRACTOR

BACKGROUND OF THE INVENTION

The invention relates to a method of producing a safety belt retractor having a vehicle-sensitive and/or webbing-sensitive blocking mechanism. The control system of this mechanism is surrounded by a cover cap placed onto one side of the loadbearing retractor housing and secured to the latter by means of detent elements. The control system has a control disc connected non-rotatably to the retractor shaft. Safety belt retractors of this design are known in numerous constructions. The loadbearing retractor housing consists generally of an O-shaped sheet metal member which is secured to the vehicle bodywork. The retractor spring is placed onto one side of said retractor housing and surrounded by a cover cap; on the opposite side of the retractor housing the drive system of the blocking mechanism is assembled. The control or activating system consists of a number of functional parts which must be installed in the correct order and position. For the assembly of the control system on the retractor housing several assembly steps are necessary which have to be carried out with great care.

SUMMARY OF THE INVENTION

The invention provides a method of producing a safety belt retractor of the type set forth which permits the assembly of the control system on the retractor housing to be considerably simplified.

This is achieved in a safety belt retractor of the type set forth above in accordance with the invention in that the control system with its functional parts and the cover cap is provided as a preassembled assembly which is adapted to be placed in the axial direction of the retractor shaft onto the one side of the retractor housing, and the control disc and the retractor shaft are provided with complementary form-locking configurations which are adapted to be pushed axially into each other.

This construction of the controlsystem permits a completely automatic assembly of the safety belt retractor. The preassembled assembly is simply led up to the retractor housing, placed in the axial direction of the retractor shaft onto the side face of the retractor housing and interlocked with the latter. All parts which come into engagement with each other during this operation are automatically aligned.

In an advantageous embodiment the controlsystem is provided with a mounting plate on which at least some functional parts of the controlsystem are mounted; the mounting plate is received in form-locking manner in the cover cap. At least one guide pin extending perpendicularly to the adjacent side of the retractor housing engages in formlocking manner into a bore of the retractor housing. Since the mounting plate is held in the cover cap in form-locking manner, all the functional parts are secured and protected between the mounting plate and cover cap. The guide pin ensures an automatic alignment of the mounting plate at the side face of the retractor housing.

A further simplification of the assembly is obtained in that a separate securing of the mounting plate to the retractor housing may be dispensed with if said mounting plate is fixed on the retractor housing by the cover cap connected to the retractor housing by detent elements. This then dispenses with the usually necessary screw, rivet or press connections.

It is also of particular advantage that the preassembled assembly permits a checking of the function of the control system before assembly on the belt retractor. In particular, the vehicle-sensitive and webbing-sensitive acceleration values and the sensor tilt angle can be checked in the assembly itself independently of the belt retractor.

BRIEF DESCRIPTION OF THE DRAWINGS

Further features and advantages of the invention will be apparent from the following description and from the drawings, to which reference is made and in which.

DESCRIPTION OF THE PREFERRED EMBODIMENT

Figure 1:
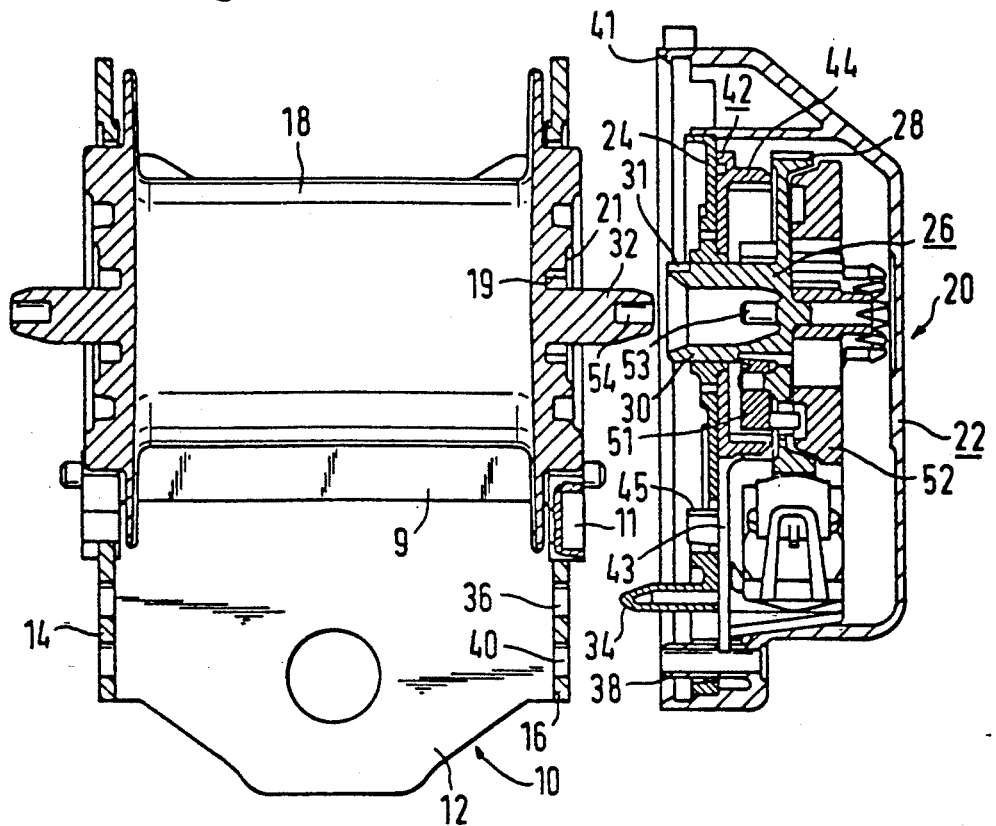
FIG. 1 shows in radial cross-section a retractor housing with retractor shaft and a preassembled assembly containing the trigger mechanism directly prior to its mounting on the retractor housing.
Figure 2:
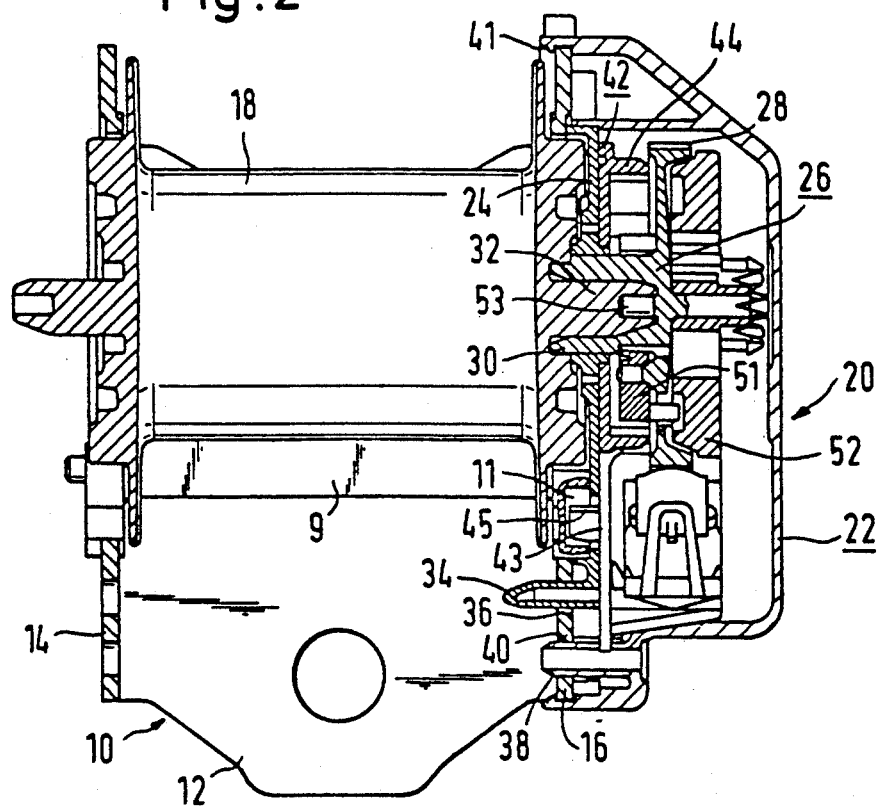
FIG. 2 is an analogous sectional view of the assembly mounted on the retractor housing.
Figure 3:
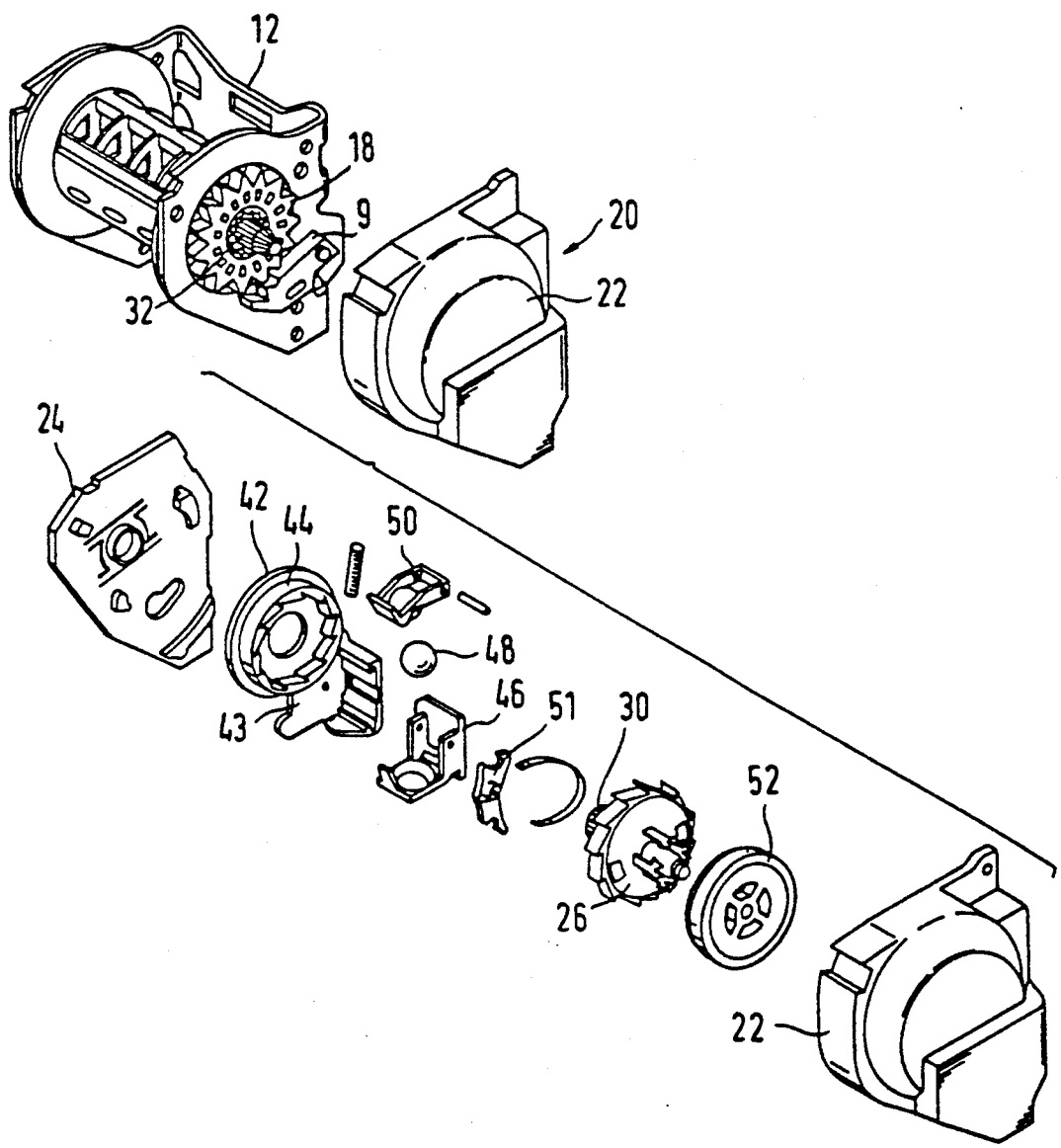
FIG. 3 is an exploded perspective view to illustrate the assembly of the safety belt retractor.

The loadbearing retractor housing 10 consists of a base plate 12 and two side plates 14, 16 which are bent at right-angles and between which a retractor shaft 18 is rotatably mounted and a blocking pawl 9 is pivotally mounted. A retractor spring having a cover cap (not shown) is fitted onto the side of the side plate 14 from the outside. On the outside of side plate 16 a preassembled assembly 20 is placed which contains the control system of the vehicle-sensitive and webbing-sensitive mechanism. This mechanism is of a design known per se and will therefore only be briefly described here.

The assembly 20 consists of a cover cap 22, a mounting plate 24 accommodated and held therein in form-locking manner and various functional parts of the control system which are built up and mounted on the side of the mounting plate 24 facing the interior of the cover plate 22. These functional parts include in particular a control disc 26 having at its outer periphery a control toothing 28 and projecting with a hollow cylindrical hub 30 through a bore of the mounting plate 24 towards the retractor shaft 18. The hub 30 is provided in its interior with form-locking configurations in the shape of axial spline elements which are constructed to match corresponding spline elements on an axial driver pin 32 of the retractor shaft 18. The driver pin 32 is tapered at its free end; the hub 30 on the other hand is widened at its end facing the retractor shaft 18. The hub 30 comprises at its free end an outer toothing 31 which is intended for engagement into a corresponding toothing 19 in an annular groove 21 at the opposite end face of the retractor shaft 18.

On its side facing the side plate 16 the mounting plate 24 is provided with a perpendicularly projecting guide pin 34 which is tapered at its free end and is intended for formlocking engagement into an opposite bore 36 of the side member 16. The cover cap 22 is provided with integrally formed guide elements which are intended for engagement into matchingly formed opposite bores 40 of the side plate 16. On a major part of its periphery the cover plate 22 is provided with a continuous detent strip 41 which is adapted to engage behind the inner side of the side plate 16 and establish a detent connection between the side plate 16 and the cover plate 22. At the same time the detent strip 41 represents a seal of the interior of the cover cap 22 so that the functional parts of the control system accommodated therein are protected.

The mounting plate 24 with the functional parts mounted thereon in turn forms a prefabricated assembly. This assembly is simply inserted into the interior of the cover cap 22. The cover cap 22 is provided in its interior with wall portions which form stops for positioning and formlocking reception of the mounting plate 24. Furthermore, on the cover cap 22 detent elements are formed which engage behind the mounting plate 24 and secure the latter in the cover cap.

Apart from the already mentioned control disc 26, the functional parts assembled on the mounting plate 24 include an actuating member 42 which is mounted for limited pivotal movement on the mounting plate 24 and comprises an actuating arm 43 for engaging the blocking pawl 9, an internally toothed drive ring 44 arranged axially adjacent the control disc 26, a vehicle-sensitive inertia sensor having a housing 46 mounted on the actuating member 42, a mass ball 48 mounted therein and a control lever 50 cooperating with the external toothing of the control disc 26, a driver pawl 51 which is pivotally mounted on the inner side of the control disc 26 and cooperates with the internal toothing of the drive ring 44, and a webbing-sensitive mass disc 52 coupled to the control disc 26.

When these functional parts of the control system have been assembled on the mounting plate 24 the assembly thus prefabricated is introduced into the cover cap 22 and with exertion of a slight pressure is pushed against the stops of the cover cap 22, the detent elements of the cover cap 22 snapping in behind the mounting plate 24. The premounted assembly 20 thus formed is now led up to the side plate 16 of the retractor housing 10 in the axial direction of the retractor shaft 18, the guide pin 34 engaging into the bore 36 and the driver pin 32 engaging into the interior of the hub 30 of the control disc 26. On further movement of the assembly 20 up to the side plate 16 the guide element 38 also engages into the bore 40.

When the spline elements on the driver pin 32 and on the hub 30 of the control disc 26 have come into engagement with each other the control disc 26 is non-rotatably coupled to the retractor shaft 18. A fine mounting of the retractor shaft 18 is also obtained in that a guide pin 53 projecting coaxially and radially spaced from the spline elements into the interior of the hub 30 engages almost without play into a corresponding axial bore 54 of the driver pin 32 of the retractor shaft 18. The alignment of the retractor shaft 18 and the control disc 26 with each other is effected by engagement of the external toothing 31 at the end of the hub 30 into the toothing 19 of the annular groove 21. At the same time, the actuating arm 43 engages via a lateral pin 45 into an opposite recess 11 of the blocking pawl 9.

As soon as the detent strip 41 comes into contact with the outer periphery of the side plate 16 it is bent outwardly and slides on the narrow side of the side plate until it moves beyond the inner edge of the narrow side and comes into detent engagement on the back of the side plate 16. The preassembled assembly 20 is now secured on the side plate 16 of the retractor housing 10.

It is thus apparent that the mounting of the preassembled assembly 20 on the retractor housing 10 is a simple operation involving only bringing said assembly up to the side plate 16 and pressing thereon until interlocking occurs. As this is done, automatic alignment takes place of all the parts which come into engagement with each other.

We claim:

1. A method of assembling a safety belt retractor having a loadbearing housing, a belt take-up shaft rotatably mounted in the housing, a blocking mechanism with a blocking pawl, and a vehicle-sensitive and/or webbing-sensitive control system with functional parts for activating the blocking pawl, the control system being provided with a mounting plate on which the functional parts are mounted and being surrounded by a cover cap placed onto one side of the housing and secured to the housing by means of detent elements, the control system having a control disc connected non-rotatably to the belt take-up shaft, the control disc and the belt take-up shaft having complementary configurations, said method comprising the steps of:
   a) preassembling the control system and the cover cap to provide a unit with the mounting plate fitted into the cover cap;
   b) placing the preassembled unit onto the one side of the housing in a location coaxial with the belt take-up shaft; and
   c) engaging the complementary configurations of the control disc and the belt take-up shaft with each other by pushing the complementary configurations axially into each other when step b) is performed.

2. A method as set forth in claim 1, wherein the preassembled unit has a guide pin extending therefrom, the housing having an opening, said step of placing the preassembled unit onto the one side of the housing includes positioning the guide pin in the opening.

3. The method of claim 2 wherein the guide pin has a tapered free end.

4. The method of claim 1 including securing the mounting plate to the housing through the cover cap, the cover cap being connected to the housing by detent elements.

5. The method of claim 1 including providing a first one of the complementary configurations with a taper at an axial end thereof facing a second one of the configurations and providing a second one of the configurations with a bottom portion corresponding in shape to the taper.

6. The method of claim 1 including providing the control disc with a hub and axially extending spline elements in the interior of the hub, the belt take-up shaft being provided with an axial driver pin and axial spline elements on the axial driver pin, and the hub being additionally provided with a coaxial guide pin which is radially spaced from the axial spline elements and is engaged into an axial bore of the driver pin.

7. The method of claim 6, including providing the hub with a toothing which is engaged into a corresponding toothing on an opposite end face of the belt take-up shaft.

8. The method of claim 1, including providing the mounting plate with the functional parts mounted thereon as a preassembled unit which is placed into the cover cap and locked therein.

9. The method of claim 1 including providing the control system with an actuating arm for the blocking pawl which is pivotally mounted on the housing and the actuating arm is provided with a lateral pin which is directed towards the blocking pawl for engagement into an opposite recess of the blocking pawl.

10. A method of assembling a safety belt retractor having a loadbearing housing with one side provided with an opening for receiving a guide pin, a belt take-up shaft rotatably mounted in the housing, a blocking mechanism with a blocking pawl, and a vehicle-sensitive and/or webbing-sensitive control system with functional parts for activating the blocking pawl, the control system being provided with a mounting plate on which the functional parts are mounted and being surrounded by a cover cap placed onto the one side of the housing and secured to the housing by means of detent elements, the control system having a control disc connected non-rotatably to the belt take-up shaft, the control disc and the belt take-up shaft having complementary configurations, said method comprising the steps of:

assembling the control system and the cover cap to provide a unit with the housing plate fitted into the cover cap and with a guide pin extending outward from the unit, and attaching the unit to the housing subsequent to assembling the unit, including locating the unit in a position coaxial with the belt take-up shaft, engaging the complementary configurations of the control disc and the belt take-up shaft together, and positioning the guide pin in the opening in the housing.

11. The method as set forth in claim 10, wherein said step of attaching the unit to the housing includes connecting the cover cap to the housing through detent means.

12. The method as set forth in claim 11, wherein said step of connecting the cover cap to the housing includes snapping a portion of the housing into a detent recess on the cover cap.

13. The method as set forth in claim 11, wherein said step of assembling the control system and the cover cap as a unit includes providing the mounting plate with the functional parts mounted thereon as a preassembled unit which is placed into the cover cap and locked therein.

* * * * *